May 25, 1926.

S. L. TERRY

LOCK

Filed Dec. 27, 1920

1,586,165

Inventor:
Samuel L. Terry

By Force Bain & Hinkle
Attys

Patented May 25, 1926.

1,586,165

UNITED STATES PATENT OFFICE.

SAMUEL L. TERRY, OF CHICAGO, ILLINOIS, ASSIGNOR TO TERRY-McCLUSKEY AUTO LOCK CO., A CORPORATION OF ILLINOIS.

LOCK.

Application filed December 27, 1920. Serial No. 433,122.

This invention relates to locks.

It is particularly applicable for locking an automobile steering gear against unauthorized use.

The lock relates more especially to those types in which the guiding of the automobile may be prevented by causing the steering wheel to revolve idly on the steering post when the automobile is locked. When the automobile is to be driven the lock may be actuated to operatively associate the steering wheel and post.

One of the objects of the invention is to provide an improved automobile steering wheel lock.

Another object is to provide a lock of increased reliability under various conditions.

Another object is to decrease the cost of manufacture of automobile steering wheel locks.

Other objects and advantages will hereinafter appear.

An embodiment of the invention is illustrated in the accompanying drawing.

Figure 1:
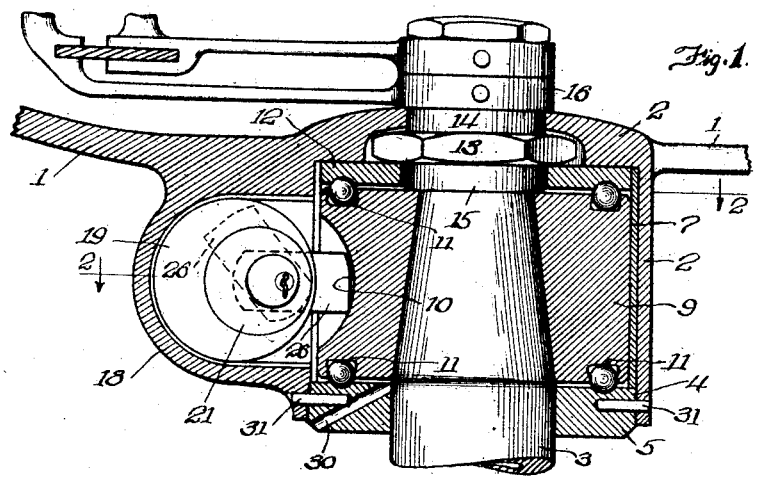
Fig. 1 is a central vertical section of a steering wheel and lock.
Figure 2:
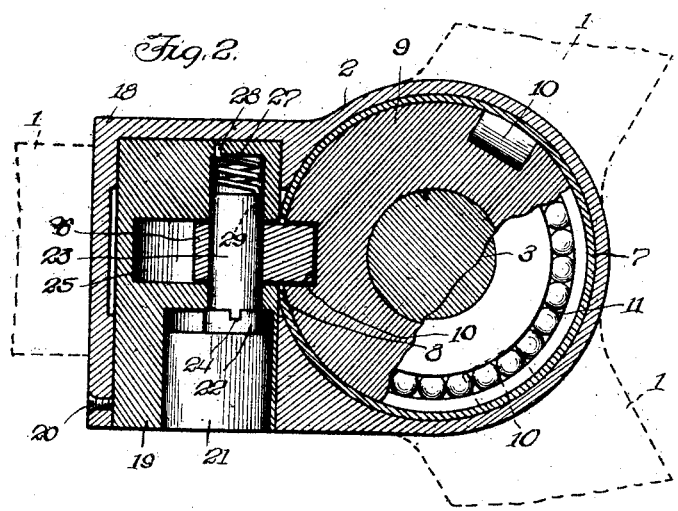
Fig. 2 is a horizontal section thereof.
Figure 3:
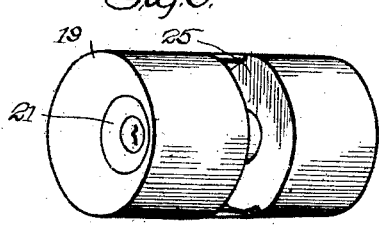
Fig. 3 is a perspective of the lock tumbler and latch-bolt casing.
Figure 4:
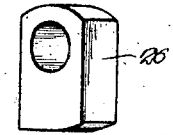
Fig. 4 is a perspective of the latch-bolt.

The central or hub portion only of the automobile steering wheel spider is shown. The spokes 1 may be connected to an outer rim of any of the ordinary types.

The hub of the steering wheel spider is formed into a generally cylindrical hollow casing 2, which houses the locking mechanism and into which the end of the steering post 3 projects. The lower end of the cylindrical chamber of casing 2 is open to permit ready assembly and installation. The lower end of the casing is provided with internal screw threads 4. When the lock is installed on the steering post, the lower end of casing 2 is closed by an externally threaded circular plate 5. Plate 5 is preferably of hardened steel and is provided with a hole through its center for the passage of the steering post.

The upper end of casing 2 converges inwardly to partly close or cap the chamber in the casing. The cap of the casing is provided with a central opening for the passage of the spark and gas control rods.

Against the cylindrical inner wall of casing 2 is a tightly fitting shell 7. Shell 7 is preferably made of hardened sheet steel and may be formed as a cylinder or tube which may be pressed into the chamber of the hub casing. This shell is of sufficient length to cover the entire inner surface of the side wall of casing 2 and be met by the upper surface of plate 5 when the plate is screwed into place. One side of shell 7 is provided with an opening 8, through which the latch-bolt of the lock, to be hereinafter described, may project.

Rigidly secured to the top of post 3 is a cylindrical collar or tubular sleeve 9. Sleeve 9 may be made of hardened steel such as a piece of steel rod. When the steering post is tapered at its upper end the hole through the center of sleeve 9 may be correspondingly tapered as shown. The diameter of sleeve 9 is such that the sleeve loosely fits within shell 7.

The periphery of sleeve 9 is provided with a series of curved recesses 10, each of which forms a socket for a latch-bolt. These recesses may be produced by running a milling cutter, of the proper width and diameter to fit the latch-bolt, into the side of the sleeve to a depth necessary to give a secure locking action between the bolt and socket.

Near the upper and lower outer edges of sleeve 9 are annular ball races 11. These races are formed by cutting annular grooves in the upper and lower surfaces of the sleeve near the outer edge thereof. Each groove is undercut so that its base is slightly wider than the diameter of the balls employed. The opening of the groove, however, is silghtly narrower than the diameter of the balls. Thus, when the balls are inserted in the races, they are loosely retained therein. The balls may be inserted by slightly spreading or upsetting the opening in the groove at one point. This operation may be accomplished by forcing a drill or punch in a groove until the metal at the opening has been forced back or upset a sufficient distance to allow the balls to be inserted, one at a time. When the race is full of balls the groove may be closed, to prevent the escape of the balls, by pressing or pounding the upset metal back in its original position. This work may be readily done so that the balls may circulate freely in the races and the point where the races were opened to admit the balls can not be detected by ordinary inspection.

The sleeve and balls are assembled into a self-sustaining unit which readily may be handled, applied to the steering post and removed therefrom.

When the sleeve, hub-casing and closing plate are in position on the steering post, the lower race of balls bears against the upper surface of closing plate 5, and the upper race of balls bears against the under surface of a hardened steel ring 12. Ring 12 and plate 5 may be slightly grooved to better seat the balls of the respective races, to prevent lateral movement and allow the overall depth of the wheel and lock to be lessened.

Sleeve 9 is held upon the steering post by a screw threaded nut 13 which fits the threaded end of the post. Nut 13 has a central section of the form common to nuts. It also has axially extending cylindrical projections 14 and 15 on opposite sides thereof. Upper cylindrical section 14 fits the opening in the cap of hub-casing 2 and forms a support and stop for the usual quadrant 16 of the gas and spark control levers. Lower projection 15 fits the opening in ring 12 and is firmly seated against the top of sleeve 9. The fit of the projections of nut 13 and the openings in the hub-casing and ring 12 are loose enough to allow free rotation but is sufficiently tight to prevent lateral or skewing movement between the parts.

An externally projecting boss or extension 18 of the hub-casing houses a key actuated self-contained latch-bolt unit. This unit is carried by a cylindrical casing 19 which fits tightly within a cylindrical recess in boss 18 where it is held by a set screw 20. Casing 19 is provided with an eccentrically located axially extending hole into which fits a barrel 21 of a key actuated lock tumbler system. The barrel may be secured within the latch-bolt casing by a pin or set screw which, when the casing is inserted in the hub, is inaccessible. Beyond the hole for the barrel and on the line of the axis of the lock tumbler 22 is a smaller hole into which rotatably fits a shaft 23. Shaft 23 is connected to the lock tumbler by a tongue and slot coupling 24. A slot 25 is cut through the surface of casing 19 and in this slot is a latch-bolt 26. Latch-bolt 26 is rigidly secured to shaft 23 by suitable means which has a pin or set screw. A spring 27, which has one end secured to casing 19 and the other end secured to shaft 23, biases the shaft and latch-bolt to unlocked position. The opposite ends of the spring may be secured to the casing and the latch-bolt shaft by drilling small holes in the casing and the end of the shaft and inserting therein the straightened ends 28 and 29, respectively, of the spring.

The shaft opening through latch-bolt 26 is located eccentrically of the bolt so that, when the shaft is turned, the bolt may be projected into one of the sockets 10 of the sleeve or withdrawn therefrom. When the latch-bolt is projected into one of the sockets, as shown by the full lines of Fig. 1, the wheel and shaft are locked together and the automobile may be steered. When the key is turned so that the latch-bolt is withdrawn from the socket, as shown by the dotted lines of Fig. 1, the wheel, when rotated, spins idly on sleeve 9 and the automobile can not be steered.

Preferably the arc of the extreme end of the latch-bolt has a shorter diameter than the arcs of the sockets of sleeve 9, so that, when the latch-bolt is thrown into locking position, there is a wedging action between the curved walls of a socket and the end of the latch-bolt. This wedging action insures that the wheel and sleeve and, consequently the wheel and steering post, will be locked tightly together and there will be no lost motion.

The selecting system in the lock barrel is so arranged, in a well known manner, that the key can be withdrawn only in its extreme positions: viz, the position wherein the wheel is completely and firmly locked to the post (driving position), or wherein the wheel and post are fully unlocked (non-driving position).

The lock and wheel are installed by slipping plate 5 down upon the steering post, then sleeve 9 with its races of balls in place is fitted upon the top of the steering post, ring 12 is placed on top of the sleeve and the sleeve and ring are firmly secured in place by nut 13. With the latch-bolt turned to unlocking position, the steering wheel is fitted down upon the sleeve and plate 5 is raised and screwed into place.

The plate may be rotated to firmly seat the same by inserting a pointed instrument into a hole 30 to act as a lever. When the plate has been screwed into the casing to firmly secure the wheel and sleeve together, it may be prevented from turning by driving small pins 31 through the walls of the casing into the plate.

The hardened steel shell surrounding the sleeve and the hardened steel upper ring and lower closing plate prevent a drill or other instrument from being driven through the outside casing into the sleeve and thus connecting the wheel and shaft so that the automobile may be steered when the car is to be locked against use. These hardened steel parts also prevent blows delivered against the outside casing, which may be made of brass or aluminum, from bending inwardly the outside casing a sufficient amount to cause the casing and sleeve to bind so that the car may be steered.

The hardened casing of the latch-bolt unit prevents the lock from being drilled into in an attempt to steal the car. This unit, being assembled into a self-sustaining structure, is readily inserted into the wheel casing.

The holding nut at the top of the steering post, in addition to holding the sleeve rigidly in place, serves as a seat or support for the control quadrant and prevents lateral or skewing movement of the casing relative to the shaft. Removal of this nut is prevented by the top of the hub-casing and the separation of wheel and sleeve is prevented by plate 5.

The anti-friction bearings come into play when the latch-bolt is turned so that the wheel should spin idly upon the post and prevent skewing or warping of the wheel to create sufficient friction between any part of the hub and the sleeve to allow the car to be steered.

With the exception of the spider of the wheel and the latch-bolt all of the parts may be formed on automatic screw machines, with a resulting material saving in cost of manufacture.

Having described my invention what I claim as new and desire to secure by Letters Patent, is:—

An automobile lock, comprising a tubular sleeve adapted to be applied to the top of an automobile steering post and having a curved depression in its periphery to form a socket for a latch-bolt, an automobile steering wheel having its hub formed into a casing for the sleeve, said casing being entirely open at the bottom and having a restricted opening through its top, a shell disposed between said sleeve and casing, a plate for closing the lower end of the casing and for holding the wheel and sleeve together, a ring above the sleeve, ball bearings interposed between the sleeve and ring and plate, a nut for screwing upon the end of the steering post and fitting the openings in the hub casing and ring to prevent lateral or skewing movement and acting to clamp the sleeve to the post, and a key actuated latch journaled in the hub and cooperating with the sleeve to lock the sleeve and wheel together.

In testimony whereof I hereunto subscribe my name.

SAMUEL L. TERRY.